Figure 1:
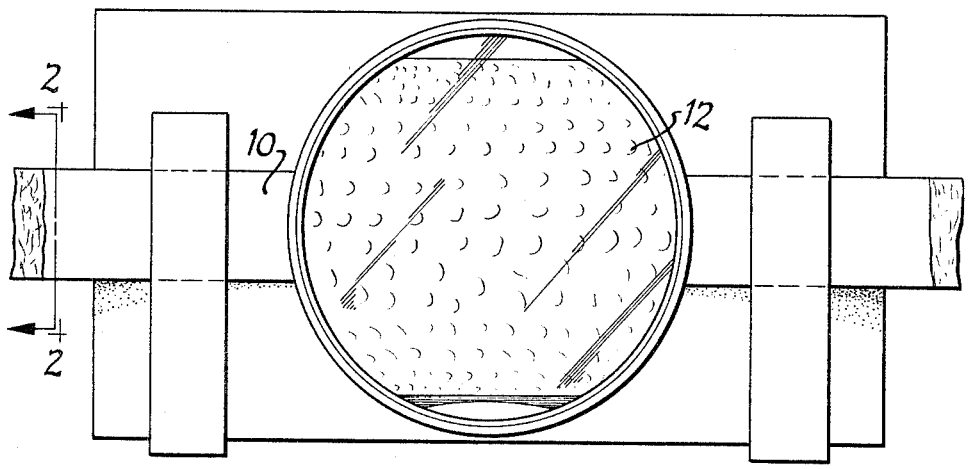

INVENTORS
RICHARD E. HORSTE
BY ROBERT E. ANDERSON
WILSON, SETTLE & CRAIG
ATTORNEYS

United States Patent Office 3,267,048
Patented August 16, 1966

3,267,048
PROCESS OF MAKING A POROUS, MOLDED SYNTHETIC RESIN ARTICLE
Richard E. Horste, Orchard Lake, and Robert E. Anderson, Birmingham, Mich., assignors to IIT Research Institute, a corporation of Illinois
Filed Jan. 10, 1962, Ser. No. 165,410
2 Claims. (Cl. 260—2.5)

This invention relates to a novel molding composition and molded product made therefrom, and more particularly relates to thermosetting synthetic resin molding compositions and to porous molded products made therefrom.

In the manufacture of automatic transmissions for automotive vehicles and other devices, it is a common practice to actuate such mechanisms by means of friction-type brake bands or clutch elements. As is well known, these automatic transmission devices are filled with hydraulic transmission fluid, and as a result all parts are bathed in this lubricating fluid. However, for satisfactory operation under the torque stresses encountered, it is important that the clutches and brake bands have high friction characteristics even in the presence of lubricating or anti-friction qualities provided by the transmission fluid. This means that the element must be fluid porous so that the fluid trapped between it and a braking surface can be conducted away through the pores, to provide positive frictional engagement.

Accordingly, it would provide an important step forward in the art if a porous, strong, high friction material, and adapted to economical manufacture, could be provided for such applications as clutches and brakes of automatic transmission and similar fluid coupling applications.

Also, there is a great commercial need for highly effective filtering media, such as for the high pressure filtering of oils and other liquids, that require purification as by removal of particulate materials therefrom.

It would accordingly provide an important step forward in the art of filtration, if a highly efficient filtering material could be provided that was chemically resistant to oil, would withstand high fluid pressures, was non-contaminating to the material being filtered, had a controlled porosity factor, and was economical to manufacture.

Accordingly, it is an important object of the present invention to provide novel molding compositions for producing molded porous products, and molded products produced from such molding compositions.

Another object is to provide an improved oil-porous friction element for use in automotive transmission.

A further object is to provide a molded article that is highly effective as a fluid filtering medium and can be produced with controlled porosity by limited compression molding.

A further object is to provide a molding composition and molded porous product therefrom that contains a thermosetting synthetic resin and bonded reinforcement fibers, with a controlled porosity factor.

A further object is to provide a molding composition and molded product that is porous and liquid permeable and thus adapted for use as a friction element or the like or as a filtering medium, wherein porosity is provided by the gases released during molding of the synthetic resin bonding material, and strength is imparted by a fibrous reinforcement material, such as steel wool.

Other objects of this invention will appear in the following description and appended claims, reference being had to the accompanying drawings forming a part of this specification wherein like reference characters designate corresponding parts in the several views.

Figure 2:
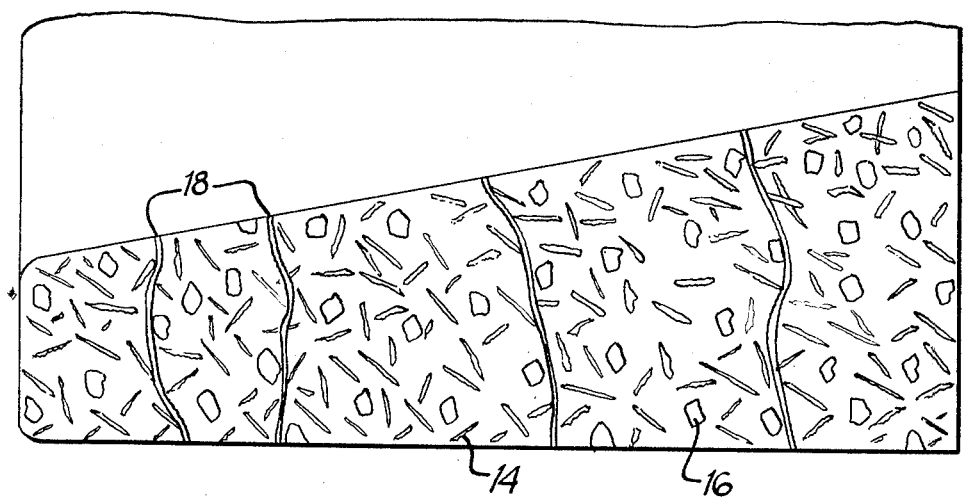

In the drawings:
FIGURE 1 is a simulated view taken through a microscope of the surface of a porous article made in accordance with the present invention;

FIGURE 2 is a greatly enlarged sectional view taken through a molded automatic transmission band made in accordance with the present invention and illustrating the porous nature of the molded material.

BRIEF PERSPECTIVE

Briefly, in accordance with the present invention, a thermosetting synthetic resin, such as a phenolic resin, is combined by admixture with a minimum amount of heat-conductive fibers, including ferrous and non-ferrous fibrous materials, and optionally with suitable fillers, and molded under heat and controlled, limited pressure to provide a porous product. In accordance with the invention, molded articles can be produced having a controlled porosity in the range from about 2% to about 50% voids.

In view of the foregoing brief perspective view, a full description of the invention will now be provided, covering all aspects and details thereof.

THE INVENTION

The molding composition of the present invention is suitably made by admixing a powdered thermosetting resin, such as a phenolic resin, with a controlled amount of heat-conductive fibers, such as steel wool, or the like. Other reinforcement fibers and filler materials are also optionally included in the composition. It is an important aspect of the invention that the metallic fibers be coated with a selected amount of oil, such as a hydrocarbon or vegetable oil, which provides uniform wetting and bonding with the resin and, incidentally, contributes to porosity formation during molding of the composition.

THE RESIN CONTENT

Broadly, the amount of resin to be utilized in the compositions of the invention will be in the range of about 10% by weight to about 70% by weight of the composition. In making high strength friction elements, it is preferred to retain the percent of resin within the range of about 15% by weight to about 35% by weight of the composition. However, for other than friction applications, where high strength is not of as great importance as in friction applications, the ends of the broad range may be applied; thus, from 15% down to about 10% by weight of resin and from about 35% up to about 70% by weight of resin can be used to make porous products as for filtering media and the like.

In the manufacture of friction articles having relatively sharp corners or the like, an enriched edge mixture, for example, containing up to about 40% resin, can be utilized without loss of strength in the part, as long as the edge is not subjected to any great or excessive frictional wear. In general, it has been found that where the resin content exceeds about 35%, burning will result during frictional operation. Therefore, where the parts are subjected to frictional operational environment, the resin content will preferably be retained below this level.

It is an important aspect of the invention that the resin used have a tendency to generate a gas upon curing; and according to the invention the gas so produced is purposely retained to provide controlled porosity in the molded product.

Resins broadly applicable to use in the invention include the phenolics which have at least a slight tendency to gasify at molding temperatures. These include the phenol-formaldehyde resins, phenol-furfural resins, resorcinol-formaldehyde resins, urea-formaldehydes and the like. Also other thermosetting resins having a slight tendency to gasify at molding temperatures can be used.

In some instances non-gasifying thermosetting resins also can be used. When so operating, it is to be included within the scope of the disclosure to add a gas-former. One typical material is calcium stearate. This material decomposes at molding temperatures of most thermosetting resins and provides a porosity-generating gas. As regards this chemical, it is to be noted that it is also an effective parting agent, serving to release the molded part upon completion of the molding cycle. As pore formers, ammonium oxalate, ammonium bicarbonate and naphthalene in small amounts also typify gas-formers that may find applicability.

While powdered resins are generally preferred because it is believed that they contribute more favorably to porosity formation, yet the extended scope of invention would include the use of liquid resin formulations with adequate mixing to provide thorough wetting of the fibers. Thus, the broad range of invention would include gas-forming resins such as phenolics and non gas-forming resins with a controlled amount of gas-former. Thus, the acrylics, epoxies and the like may be used in selected instances with an appropriate gas-former.

THE FIBROUS CONTENT

The broad range of fibrous content that can be utilized will comprise from about 90% by weight to about 30% by weight of the composition, thus generally complementing the resin content; but this is subject to some variation, depending upon other additives that can be optionally added, such as gasification agents and fillers. In all cases it will be generally desirable to have at least about 30% by weight of the composition made up of heat-conductive fibers. By so operating, particularly when forming parts of heavier cross-section, a sufficient heat-transfer will be provided by the fibers to the center of the part to provide effective curing throughout the part, as well as in the area of highest heat transfer from the mold, i.e., at the points where the part actually contacts the mold. While the exact mechanism of the invention is not known, this metallic fiber content is apparently an important contributing factor to the success and controlled porosity production for limited compression molding techniques, as illustrated by the specific example given hereinafter.

Heat-conductive fibers applicable to use in the invention include those made of both ferrous and non-ferrous metals; and it has been found that steel wool fibers perform very well by providing adequate heat conductivity for full cure to the center of the part. Also, these fibers provide economical manufacture because of their low cost. Also, however, non-ferrous fibers such as aluminum, copper and the like, as well as their alloys such as bronze, brass, etc. can be used.

Fiber dimensions are subject to substantial variation within the broad scope of invention and in an actual embodiment it has been found that steel wool fibers having a minimum length of about 1/32 inch and an average diameter of about 0.003 inch produced a very excellent molded product. However, both maximum length and fiber diameter are subject to substantial variation and in some instances fiber diameters can range up to .015 inch and lengths can vary up to 1 inch or longer, depending upon the part being molded.

As briefly mentioned before, it is desirable that the fibers be coated with a small amount of hydrocarbon oil or vegetable oil to give improved wetting and bonding between the fibers and the resin. Also, these materials tend to gasify at molding temperatures and thus also contribute to the porosity of the product.

Generally, the amount of oil will be in the range from about 0.8% by weight to about 3% by weight of the fibers. One particular oil that can be used is called "Mobil-Met 34," a hydrocarbon oil manufactured by the Mobil Oil Company.

Along with the thermally conductive fibers, the fibrous content may comprise other filler fibers such as glass fibers, quartz fibers, asbestos fibers, aluminum silicate fibers, or similar fibrous materials. These are resistant to thermal decomposition at molding temperatures of the resins and contribute to the tensile properties of the product; drawn glass fibers are particularly advantageous in this respect due to their excellent high tensile properties. Also, these fibers are chemically resistant to oils and thus produce durable moldings.

Thus, in summary, from about 30% to about 90% of the weight of the composition may be fibrous, with about 30% of the weight of the composition preferably comprising heat-conductive fibers for complete curing by limited compression techniques, particularly in parts of heavier cross-section.

Also, a portion of the fibrous content may be substituted by a filling agent, and as will become apparent from the Specific Example given hereinafter, metallic filings such as bronze filings may be used. These have the advantage of heat conductivity for the limited pressure, porosity-forming molding concept of the invention.

THE MOLDED PRODUCTS

Molded products made from the molding compositions of the present invention are generally about 20% to about 35% as dense as steel and contain from about 2% to about 50% void spaces, depending upon the particular starting composition. For optimum strength in the production of friction elements, about 3% to about 10% void space will be preferred. A 50% porosity limit has been suggested because strength falls off rapidly above this level. However, for filtering media and low strength applications, the broad scope of invention could include higher void levels than those indicated.

SPECIFIC EXAMPLE

To demonstrate the present invention, a run was made wherein powdered phenolic resin sold under the trade name "Bakelite" phenolic bonding material BRP–661 manufactured by Union Carbide Plastic Co., Division of Union Carbide Corp., 30 E. 42d Street, New York 17, New York, was used. This phenolic bonding material is a high melting powdered resin characterized by a very short flow which is fast setting and has little or no tendency to cause "swell" in fast baking cycles. The material has a density of from 0.31 to 0.36 gram per cubic centimeter and 97.0% of the material passed through a 200 mesh screen. In this run, the powdered resin was admixed with low carbon steel fibers having a maximum length of about .047 inch and an average diameter of about .003 inch. Additionally, bronze filings of an average particle size of about .0102 inch by .0045 inch were included.

The amounts of materials in the molding composition were as follows:

|  | Percent by weight |
|---|---|
| Powdered phenolic resin | 30 |
| Steel fibers | 50 |
| Bronze filings | 19 |
| Hydrocarbon oil as fiber lubricant | 1 |

The finely divided materials were admixed in a conventional mixing drum at about 950 r.p.m. for about ten minutes. Thereafter, an appropriate amount of mixture was placed in a completely closing steel mold and the filled mold was thereafter placed between two platens heated to about 600° F. These molds were urged together under a hold-down pressure of about 7,500 lbs. per square inch. The mold arrangement was such that the mold parts were in steel-to-steel contact, so that the resin and fiber mixture was not subjected to the full 7,500 lbs. per square inch. Thus, though the mold was initially filled, the compression of the molding material was not sufficient to produce 100% density.

The mold was maintained closed at the indicated temperature between the platens for a period of 2½ minutes. Thereafter, the mold and contents were removed from between the platens and allowed to dwell for one minute at the residual temperature of the mold, that is on the order of 500° F. At the end of this dwell period, the mold was opened and the article removed, followed by final curing in an oven at 400° F. for about 15 minutes. The final part had a specific gravity of about 28% of the density of steel. In physical characteristics, the molded part displayed a tensile strength of about 1,000 p.s.i. at about 2% elongation. The void space of the molded article was about 7%, and the part had a compression strength of about 4,000 p.s.i.

By reference to FIGURE 1 of the drawings, the molded piece for an automatic transmission is represented by the numeral 10, and at a 3½ power magnification, the porous openings show up as numeral 12.

In FIGURE 2 of the drawings, a photomicrograph taken from a dense section of the part is represented. This was reproduced by hand from a color photograph. The steel fibers are represented by the numbers 14 and are interspersed throughout the piece. The bronze particles are represented by the numeral 16. Pores through the product are represented by the numeral 18.

The relatively high concentration of bronze filings can be seen in this area of the photograph. Approximately 35% of the total area is bronze. The average bronze particle size was .0102 inch x .0045 inch and the largest bronze particle size was .0160 inch x .0106 inch; the shortest steel wool fiber was .0009 inch long and the longest steel wool fiber was .047 inch long.

ADVANTAGES OF THE PRESENT INVENTION

From the foregoing, it will be obvious that an improved molding composition capable of producing products of controlled porosity is provided. Thus, in accordance with the present invention a broad range of products can be produced having a broad, but controlled porosity range. These products are highly effective for oil-pervious friction elements as used in automatic transmissions, are resistant to stresses under high temperatures, and are of high tensile strength and compressive strength.

Having thus described our invention, we claim:

1. In a method of producing a porous, molded synthetic resin article of manufacture, the steps of filling a mold with a composition consisting essentially of powdered thermosetting resin and at least 30% of oil-coated short length metallic fibers, closing said mold on said composition at a pressure less than that sufficient to produce 100% density of the composition, heating said compressed composition to molding temperature to produce a molded article, releasing said pressure and curing said article.

2. In a method of producing a porous, molded synthetic resin article of manufacture, the steps of filling a mold with a composition consisting essentially of:

| | Percent by weight |
|---|---|
| Powdered phenolic resin | 30 |
| Steel fibers, short length | 50 |
| Bronze filings | 19 |
| Hydrocarbon oil fiber lubricant | 1 | closing said mold on said composition at a pressure less than 7500 p.s.i., heating said compressed composition to about 600° F. for 2½ minutes to produce a molded article, releasing said pressure, retaining said article at the residual temperature of the mold for 1 minute, and curing said article.

References Cited by the Examiner

UNITED STATES PATENTS

| | | | |
|---|---|---|---|
| 1,775,389 | 9/1930 | Eubanks | 260—38 |
| 2,369,502 | 2/1945 | Walker | 260—38 |
| 2,554,548 | 5/1951 | Albagnac | 260—38 |
| 2,587,945 | 3/1952 | Wirth | 260—38 |
| 2,605,877 | 8/1952 | Winther | 260—38 |
| 3,007,890 | 11/1961 | Twiss et al. | 260—38 |

MURRAY TILLMAN, *Primary Examiner.*

LEON J. BERCOVITZ, *Examiner.*

M. FOELAK, W. J. BRIGGS, Sr.,
*Assistant Examiners.*